MAGNETIC SUPPORT SYSTEMS

Filed Dec. 18, 1967 5 Sheets-Sheet 1

*INVENTORS*
Alfred G. Emslie
Ivan Simon
BY Bernie G. Lepper
Attorney

*INVENTORS*
Alfred G. Emslie
Ivan Simon
Attorney

MAGNETIC SUPPORT SYSTEMS

Filed Dec. 18, 1967 5 Sheets-Sheet 3

*INVENTORS*
Alfred G. Emslie
Ivan Simon
Bernie A. Lepper
Attorney

MAGNETIC SUPPORT SYSTEMS

Filed Dec. 18, 1967 5 Sheets-Sheet 4

*INVENTORS*
Alfred G. Emslie
Ivan Simon

Attorney

*INVENTORS*
Alfred G. Emslie
Ivan Simon
Bernie G. Lepper
Attorney

United States Patent Office 3,493,274

Patented Feb. 3, 1970

3,493,274

MAGNETIC SUPPORT SYSTEMS

Alfred G. Emslie, Scituate, and Ivan Simon, Belmont, Mass., assignors to Arthur D. Little, Inc., Cambridge, Mass., a corporation of Massachusetts Filed Dec. 18, 1967, Ser. No. 691,576
Int. Cl. F16c *39/06*
U.S. Cl. 308—10 13 Claims

ABSTRACT OF THE DISCLOSURE

An essentially friction-free support system wherein a movable member has a supported mass, preferably of a diamagnetic material, attached to each end. Each diamagnetic supported mass has a ferromagnetic supporting mass associated with it, the supporting mass being of a configuration to generate a magnetic field of an intensity which decreases sharply from its surface to its associated supported mass. It is also possible to reverse the arrangement and form the supported mass of a ferromagnetic material and the supporting mass of a diamagnetic material.

There are many instances where it would be desirable to be able to move a body, either through rotation or translation, with respect to one or more other bodies with a minimum amount of surface-generated friction. Bearings, of course, seek to accomplish this whether they are journal bearings, thrust bearings, or other types. An extensive amount of work has been done over a number of years on the design and construction of bearings with special emphasis being placed on bearing surface materials, on various types of lubricants, and on new bearing concepts. Among the latter are the so-called fluid bearings which maintain surfaces in a required relative relationship through the use of pressurized fluids.

Although many of the problems being faced today in bearing design are concerned with applications where gravity is a factor to be considered, there are also many applications now arising where the force of gravity is minimal or even becomes zero. Moreover, there are now applications where extremely low pressures, some of which approach a true vacuum, are to be encountered. These new and extended operational environments place additional requirements on support or bearing designs. It is, of course, recognized that under zero *g* conditions the term "support" no longer connotes a means for overcoming the force of gravity or of bearing the weight of a body; but for convenience of presentation, the term is used hereinafter to refer to the positioning and constraining of an object or a body within certain limitations whether or not any gravitational forces must, in fact, be overcome.

The extension of operational environments places certain additional requirements on bearing or support system performance and presents additional problems which must be solved. Among such additional requirements are the ability to operate over extended periods of time without maintenance, the ability to constrain a body within certain limits under zero *g* conditions, and the ability to function at extremely low temperatures and/or low pressures. The problems resulting from these additional requirements include the difficulties encountered in handling lubricants to prevent them from vaporizing at low pressures or solidifying at low temperatures; the difficulties of pumping lubricants or fluids under zero *g* conditions; and the generation of unwanted heat through surface contact friction. It, therefore, would be desirable to be able to provide a support system which required no lubrication, was entirely free from surface-generated friction, developed no appreciable heat, and remained reliable over extended periods of time.

It is, therefore, a primary object of this invention to provide an improved support system capable of functioning under any or all operational conditions including zero gravity and extremely low-pressure and/or low-temperature environments. It is another object of this invention to provide a support system of the character described which is based upon magnetic phenomena that remains operational over a wide range of physical conditions, and which is applicable to a large variety of instruments. It is another object of this invention to provide a novel support system which is flexible in design and application and capable of permitting rotational motion, translational motion, or a combination of these and of acting in the role of a journal or a thrust bearing. Other objects of the invention will in part be obvious and will in part be apparent hereinafter.

The invention accordingly comprises the several steps and the relation of one or more of such steps with respect to each of the others, and the apparatus embodying features of construction, combinations of elements and arrangements of parts which are adapted to effect such steps, all as exemplified in the following detailed disclosure, and the scope of the invention will be indicated in the claims.

For a fuller understanding of the nature and objects of the invention, reference should be had to the following detailed description taken in conjunction with the accompanying drawings in which.

Figure 1:
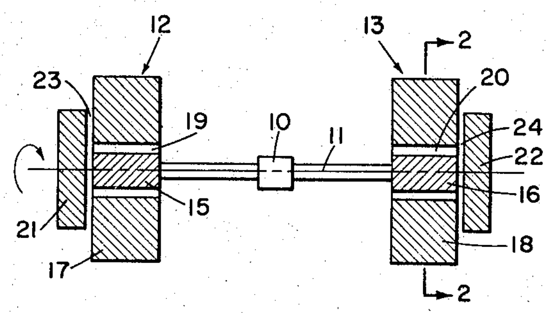
FIG. 1 is a longitudinal cross section through a bearing constructed in accordance with this invention.
Figure 2:
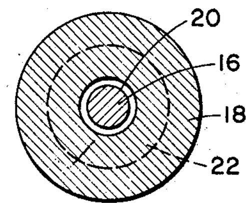
FIG. 2 is a cross section of the bearing of FIG. 1 taken along line 2—2 of FIG. 1.

In the support system of this invention, the body which is to be supported or positioned and to which a predetermined motion, within certain limits, is to be imparted is mounted on a movable member, which is adapted to support and constrain the body to be moved. Associated with each end of the movable members are a pair of magnetically repelling masses, one of which is diamagnetic, the other ferromagnetic. The surfaces of these two masses are maintained in a spaced relationship such that there is no physical contact between the surfaces. The necessary degree of magnetic repellency is achieved by establishing between the mass surfaces a magnetic field having a sharp field intensity gradient decreasing from the ferromagnetic surface to the diamagnetic surface. FIGS. 1 and 2 are presented to illustrate the basic components of the support system; while FIGS. 3–10 illustrate various configurations for developing the necessary magnetic fields.

FIGS. 1 and 2 are presented to illustrate the basic fundamentals of the support system of this invention. Detail embodiments of this support system will be discussed below with reference to FIGS. 11–25. In FIG. 1 a body 10 which is to be supported and moved is attached to a mounting member 11. The body to be supported may be any one of a number of different types of components, and its motion may be induced in many ways including magnetically, electrostatically, thermally, etc. For example, this body may be an optical member such as a slit or mirror; or it may be a small indicating member such as an arrow or thin rod. It may be an element of a valve, a contact member for closing or opening circuits, etc.

The mounting member 11 is held in position at either end within two areas of support 12 and 13. At the two ends of the mounting member are positioned supported masses 15 and 16 which exhibit a desired magnetic property. If desired, these masses may, of course, be integral with the mounting member 11 itself. Associated with the end masses 15 and 16 are their respective supporting masses 17 and 18, which in the case of a journal bearing would, of course, form an outer race. However, inasmuch as in the support system of this invention there is no physical contact made between the surfaces of supported masses 15 and 16 and the surfaces of supporting masses 17 and 18, there is defined between these surfaces annular spaces 19 and 20 in which the magnetic field of the required characteristics is generated. It will be apparent, as illustrated in several of the embodiments to be described, that the supporting masses 17 and 18 do not of necessity have to surround supported masses 15 and 16 but may exert their desired influence with respect to only a portion of the surfaces involved.

It will, of course, be appreciated that the support systems of this invention do not have to be so oriented as to actually support the weight of the body and the masses, but may be positioned such that mounting member 11 is at any desired angle to the horizon. In such arrangements, as in the case of decreased gravitational forces, the support system may be primarily directed to positioning or constraining rather than actual lifting. Hence the terms "supported mass" and "supporting mass" are used to include those embodiments or modifications wherein the moving mass member is to be positioned in spaced relationship to its associated mass member, the latter being stationary or movable.

In a manner somewhat analogous to thrust bearings, the translational motion of mounting member 11 and hence of body 10 may be controlled, limited, or constrained through the use of additional masses 21 and 22, which through the establishment of the desired magnetic field within spaces 23 and 24 are capable of developing repellent forces between translational constraining members 21 and 22 and respective masses 15 and 16.

In order to develop the desired degree of magnetic repellency between the masses defining the support system, it is necessary that one of the masses be strongly ferromagnetic and of a configuration to develop a magnetic field having a sharp field intensity gradient and that the other mass be a diamagnetic material having a diamagnetic susceptibility great enough to be repelled by the magnetic field gradient to maintain the spaced relationship of the surfaces involved. The required force of repulsion of the two masses in a magnetic field may be written as $$F=|\chi|\frac{\nu}{2}\nabla\overline{H^2}$$

where the average of $H^2$ is taken over the volume $\nu$ of the repelled or diamagnetic mass. $\chi$ is its diamagnetic susceptibility, and F is the load force acting upon the supported mass. Thus, the magnetic fields in support systems used in applications where gravitational forces are present must be of sufficient strength to overcome the gravitational force $F=mg$ exerted on the body 10 to be supported on the mounting member 11 and on the supported masses 15 and 16 (see FIG. 1). (In this case, $m$ represents the mass and $g$ the acceleration of gravity.) In practice, the value of $$\Delta\overline{H^2}$$

is limited by the size and energy product $(BH)_{max}$ of the magnet. It is also, of course, desirable to use a material for the diamagnetic mass which has the highest possible value of specific susceptibility $\chi/\rho$ ($\rho$ denoting the density of the material).

Pure graphite has been found to be the best diamagnetic material for the mass, although other materials may be used. These other materials include, but are not limited to, fused quartz, boron, beryllium, bismuth, and certain other metals, glasses, and liquids, the latter being contained within suitable tubing. It is, of course, well known that a superconductor has the highest possible value of diamagnetic susceptibility, and it is within the scope of this invention to employ a superconducting mass and provide means for maintaining the support system at a temperature sufficiently low to maintain the masses superconducting.

It will normally be more convenient to construct support systems according to this invention wherein the supported masses affixed to the ends of the mounting member (e.g., masses 15 and 16 of FIG. 1) are formed of a diamagnetic material and the supporting masses surrounding or partially surrounding the diamagnetic masses are of a ferromagnetic material. However, it is also possible to use the opposite arrangement wherein a ferromagnetic material forms the supported masses of the mounting member, and the supporting masses are of a diamagnetic material.

FIGS. 5–22 illustrate basic construction patterns which may be used in the support system of this invention. It is, of course, also possible to use other patterns which are modifications of those shown in the figures, for example those which are intermediate between a flat and cylindrical or between a cylindrical and spherical surface. Any configuration which is capable of forming the required magnetic field in positional relationship to the diamagnetic body may be used.

Figure 3:
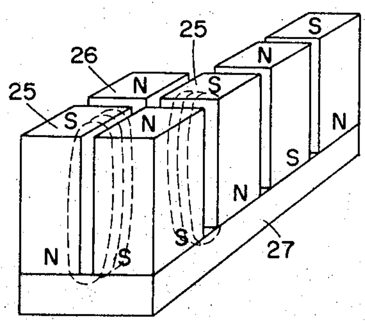
FIG. 3 is a perspective view showing how a portion of a flat surface may be formed to provide the desired magnetic field gradient.
Figure 4:
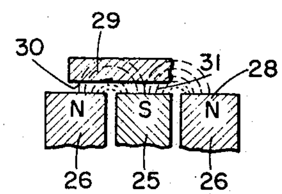
FIG. 4 is a fragmentary cross section of the surface of FIG. 3 showing the levitation of a diamagnetic body.

FIGS. 3 and 4 illustrate the manner in which a frictionless motion may be achieved between two essentially flat surfaces. In FIG. 3 there is illustrated one way in which the necessary magnetic field with the sharp field intensity gradient may be developed. In the arrangement of FIG. 3, a plurality of magnets 25 and 26 are arranged in checkerboard fashion such that the polarity of the magnets alternates. In keeping with well-known practice, it will generally be desirable to mount such magnets on a flux-conducting member 27 in order to enhance the flux flow as illustrated by the dotted lines in FIG. 3.

FIG. 4 illustrates a small portion of the magnetic system of FIG. 3 in cross section and shows how the required magnetic field is established. It will be seen that the flux lines, which are dotted, develop a magnetic field which is intense at the surface 28 and which decreases sharply in intensity as the distance from surface 28 increases. A diamagnetic body 29 having a surface 30 facing surface 28 will be levitated and, therefore, held in spaced relationship to surface 28 by virtue of the magnetic field 31. In any configuration described and discussed below, the repelling mechanism is the same as shown in FIG. 4, although the actual configuration of the magnetic field may vary.

Figure 5:
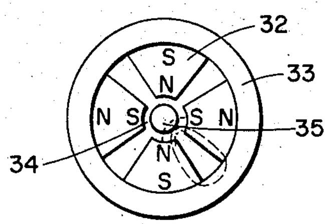
FIGS. 5 and 6 are tranverse cross sections of two embodiments in which the ferromagnetic masses comprise a plurality of magnets having poles which alternate circumferentially.
Figure 6:
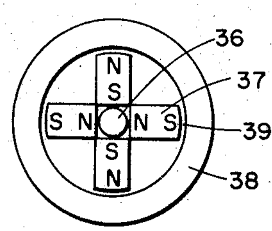

FIGS. 5 and 6 illustrate basic arrangements for one end of a support system if rotary motion of the body is desired. In FIG. 5 magnets 32, arranged to have opposite polarities in adjacent magnets in the circumferential direction, are mounted on a suitable flux-conducting member 33 to define a cylindrical magnetic field 34 having the required field intensity gradient as illustrated diagrammatically by the dotted flux lines. Although the diamagnetic mounting member to be supported in magnetic field 34 may assume a number of cross sections, this particular arrangement is primarily suited to the circular journal member 35 which may be readily rotated.

FIG. 6 illustrates an embodiment, suitable for rotary motion, which is the reverse arrangement of the embodiment of FIG. 5; that is, the ferromagnetic body is the supported mass. Thus, journal 36 has magnets 37 mounted thereon and arranged so that the poles alternate circumferentially and maintain the diamagnetic annular ring 38 in spaced relationship such as to provide a small gap 39. In FIGS. 5 and 6 the journals 35 and 36 (supported masses) may rotate, or the magnets 32 or diamagnetic ring 38 (supporting masses) may rotate.

Figure 7:
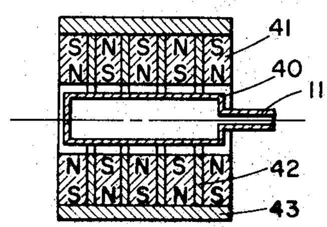
FIGS. 7 and 8 are longitudinal cross sections of two embodiments in which the ferromagnetic masses comprise a plurality of magnets having poles which alternate in the axial direction.
Figure 8:
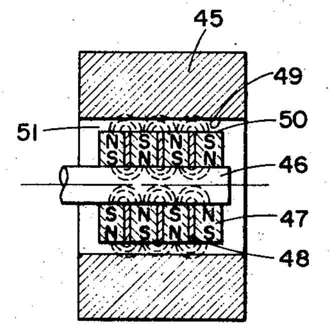

In the embodiments of FIGS. 7 and 8 the polarities of the magnets making up the ferromagnetic masses alternate in the axial direction, FIG. 7 illustrating the use of a diamagnetic body as the supported mass, and FIG. 8 the use of a ferromagnetic body as the supported mass. In FIG. 7, the supported mass 40 is shown as a hollow diamagnetic cylinder attached to the mounting member 11. The supporting member is a series of annular ring magnets 41 attached through spacers 42 and arranged so that the polarity of the rings alternates along the axis of the support system. A flux-conducting cylindrical member 43 surrounds the ring magnets 41.

FIG. 8 is the reverse arrangement of FIG. 7. It is adapted for circular rotary motion in which the supporting mass is formed of a diamagnetic material which surrounds a supported ferromagnetic mass. For rotary motion, there is provided a cylindrical diamagnetic mass 45 and a journal member 46 which is conveniently constructed of a magnetically permeable material to serve as a flux-conducting member for a series of annular magnets 47 affixed to the journal 46 and attached through spacers 48. By using magnets 47 which have alternating polarities in the axial direction, it is possible to maintain the surface 50 of the ferromagnetic supported mass in spaced relationship with the surface 49 of the diamagnetic mass by developing within annular space 51 the required magnetic field having a sharp field intensity gradient. The arrangements of FIGS. 6 and 8, wherein the ferromagnetic masses are the supported masses attached to the mounting member, will generally find applications in which the gravitational force is either small or zero. This is due to the fact that in general magnetic materials of the type which are capable of generating the required magnetic field have relatively high specific gravities and thus require a high degree of repellency to overcome the gravitational force. However, where gravitational force is not an important factor, the actual weight of the masses is no longer a primary consideration.

Figure 9:
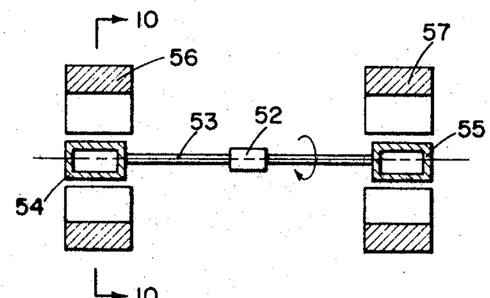
FIGS. 9 and 10 are longitudinal and transverse sections of a modification of the embodiment of FIG. 5.
Figure 10:
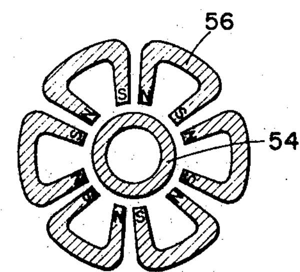

FIGS. 9 and 10 illustrate another embodiment of the support system suitable for rotational motion. As in the case of the embodiments of FIGS. 5 and 6, the polarity of the magnets varies circumferentially. The mass 52 to be supported is mounted on a cylindrical rod 53 which terminates in two hollow diamagnetic bodies 54 and 55. These in turn are held in spaced relationship within a cylindrical magnetic field defined by a plurality of horseshoe magnets 56 and 57.

It will be appreciated from an examination that the embodiments of the support system which are illustrated in FIGS. 5–10 are capable of achieving translational motion as well as rotational motion.

Figure 11:
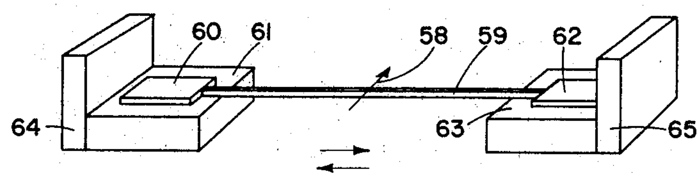
FIGS. 11 and 12 illustrate embodiments for achieving translational motion.

FIGS. 11–16 illustrate embodiments of the support system of this invention designed to achieve translational motion, circular motion, or rocking motions. In FIG. 11 the body to be moved is illustrated as small arrow 58 mounted on a rod 59 which terminates at one end in a diamagnetic mass 60 levitated above a ferromagnetic mass 61 and at the other end in a diamagnetic mass 62 levitated above a ferromagnetic mass 63. If desired, the translational motion, indicated by the arrows, may be constrained by the use of additional ferromagnetic masses 64 and 65 positioned to develop magnetic fields which are capable of exerting the necessary forces on the ends of masses 60 and 61. The ferromagnetic masses 61, 63, 64, and 65 are preferably constructed in the mode illustrated in FIG. 3. It will be appreciated that such a support system as shown in FIG. 11 will be satisfactory for use where the gravitational force is greater than zero since no restraining or constraining means are provided for maintaining the diamagnetic masses within the magnetic field from above.

Figure 12:
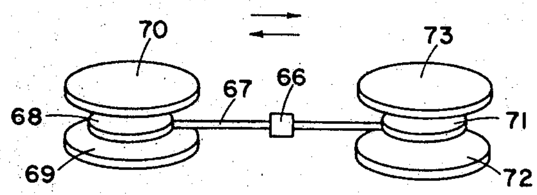

The embodiment of FIG. 12 is adapted for achieving translational motion and may be used under conditions where the gravitational force is zero or greater than zero. In the modification in FIG. 12, the supported body 66 is affixed to a rod 67 on one end of which is positioned a supported diamagnetic mass 68 in the shape of a disc held in spaced relationship between two supporting ferromagnetic discs 69 and 70. In like fashion, the diamagnetic supported disc 71 on the other end of rod 67 is held in spaced relationship between supporting ferromagnetic discs 72 and 73.

Figure 13:
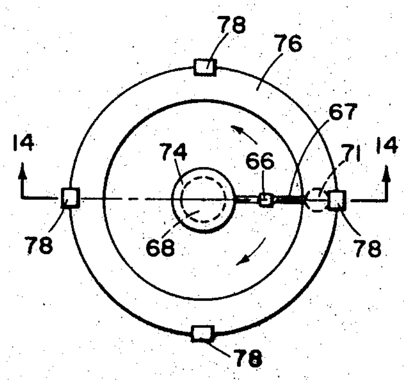
FIGS. 13 and 14 are top plan and cross sectional views of an embodiment adapted for achieving circular motion.
Figure 14:
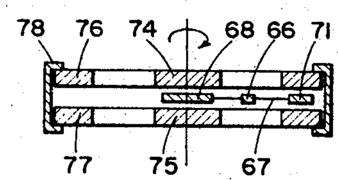

The arrangement illustrated in FIGS. 13 and 14 is designed to achieve frictionless circular motion of the body 66 mounted on the rod 67. In this arrangement the supported mass 68 is maintained in spaced relationship between central supporting masses 74 and 75, while the supported mass 71 is maintained in spaced relationship between an upper outer supporting ring mass 76 and a lower outer supporting ring mass 77, the rings being mounted on suitable brackets 78. As shown in FIG. 13, this arrangement permits the movement of the body 66 through a complete circuit.

Figure 15:
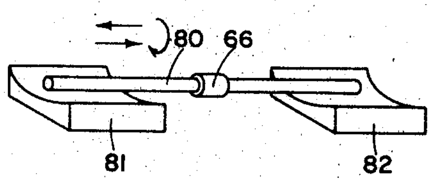
FIG. 15 illustrates an embodiment for achieving both translation and rotational motions.

The embodiment of FIG. 15 is designed to provide at least partial rotational or rocking movement as well as translation motion. In this modification the body 66 is mounted on a diamagnetic rod 80 which at its ends provides the necessary diamagnetic masses positioned above supporting ferromagnetic concave masses 81 and 82.

Figure 16:
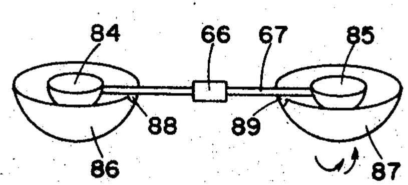
FIG. 16 illustrates an embodiment for a rocking motion.

The embodiment of FIG. 16 is adapted to permit a rocking motion of body 66. The hemispherical diamagnetic bodies 84 and 85 are held in spaced relationship within hollow hemispherical ferromagnetic masses 86 and 87 constructed in a manner to provide the required magnetic field. The rod 67 is free to turn in notches 88 and 89 in the hemispheres 86 and 87 without making surface contact. It will be appreciated that the magnetic field developed by the hollow hemispherical masses, such as 86, is radially symmetrical, which in turn means that the translational motion of rod 66 is reduced to essentially zero.

Figure 17:
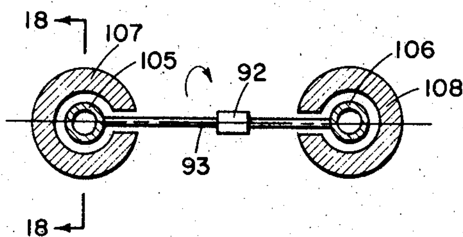
FIGS. 17 and 18 illustrate a modification in cross section for achieving rotary motion only.
Figure 18:
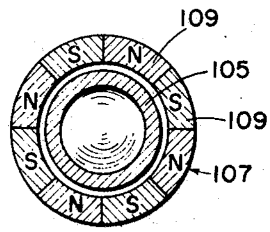

FIGS. 17–22 illustrate various embodiments of the support system for achieving rotary motion only. In FIGS. 17 and 18 the body 92 to be rotated is mounted on member 93 which has spherical masses 105 and 106 at each end. These masses may be hollow as shown in FIGS. 17 and 18, or they may be solid. The spherical diamagnetic supported masses 105 and 106 are located within essentially hollow spherical supporting masses 107 and 108 constructed of magnets 109 arranged to have alternating polarities as shown in the central cross section of FIG. 18.

Figure 19:
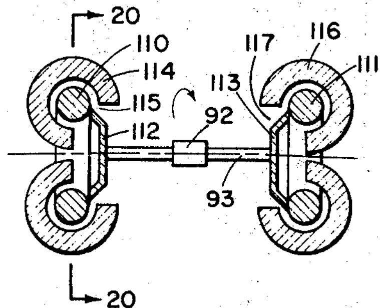
FIGS. 19–22 illustrate embodiments, in cross section, for rotary motion based upon annular ring configurations with various ferromagnetic mass configurations.
Figure 20:
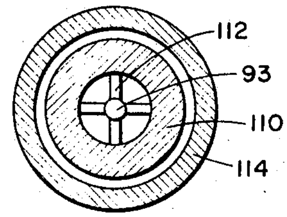

The diamagnetic mass may also assume the form of an annular ring or doughnut-shape as illustrated in FIGS. 19–22. In the modification of FIGS. 19 and 20, the rod 93 is connected to ring-shaped supported masses 110 and 111 through suitable struts 112 and 113. These masses are held in position within hollow doughnut-shaped supporting ferromagnetic masses 114 and 116 having wedge-shaped gaps 115 and 117, the gaps permitting the strut-support system to be joined to the rod 93.

Figure 21:
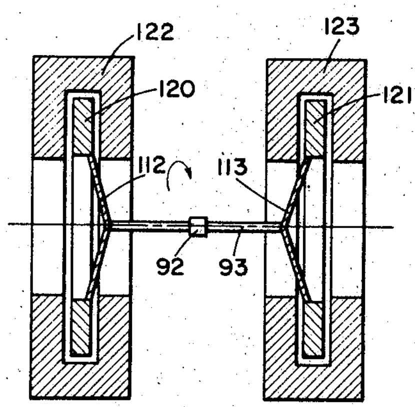

FIG. 21 shows annular ring-shaped supported masses 120 and 121 used in conjunction with ring-shaped supporting masses 122 having U-shaped cross sections.

Figure 22:
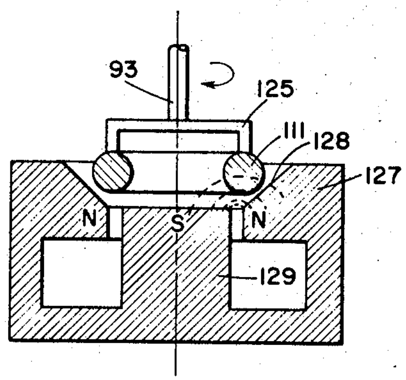

FIG. 22 shows one end of a support system in which the supported masses take the form of an annular ring attached to the rod 93 through a strut 125. The magnetic field is generated in this configuration by an outer annular pole 127 having an inclined face 128 and a central pole 129. The field intensity gradient is generated as shown by the dotted flux lines.

Figure 23:
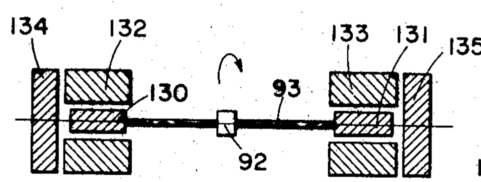
FIGS. 23–25 show support systems which combine the functions of a journal bearing and thrust bearing.
Figure 24:
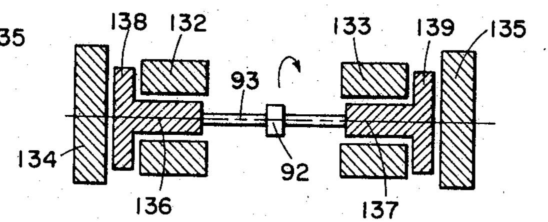
Figure 25:
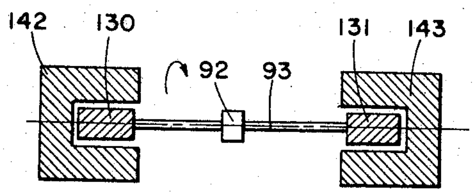

FIGS. 23–25 illustrate support systems which incorporate the control or restraint of thrust forces without the generation of any surface-contact friction. In these modifications frictionless, rotational, translational, or rocking motions may also be experienced.

In the modification of FIG. 23 the supported masses 130 and 131 and the supporting masses 132 and 133 may assume any configuration—for example, those of FIGS. 5–10 if rotational motion is to be achieved or of FIGS. 11, 12, or 15 if translational is desired. If the supporting masses are formed of a ferromagnetic material, then thrust masses 134 and 135 must also be ferromagnetic in order to constrain axial motion of supported masses 130 and 131. It is also, of course, possible to form the supporting masses 132 and 133 and the thrust masses 134 and 135 of a diamagnetic material and use a ferromagnetic material for the supported masses 130 and 131.

In the modification of FIG. 24 the thrust forces are somewhat enhanced by forming the supported masses 136 and 137 to have enlarged end members 138 and 139 which increase the repelling forces between the masses.

In the embodiment of FIG. 25 the supporting masses are made integral with the thrust masses to provide unitary support thrust masses 142 and 143.

Those masses, either supported or supporting, which are ferromagnetic in character and are used to form the magnetic field having the desired density gradient may be permanent magnets or may be electromagnets, this interchangeability being well known in the art. Moreover, the ferromagnetic masses may incorporate poles formed of highly magnetically permeable materials as is also well known in the art.

It will be seen from the above description of the support system of this invention that it is capable of permitting the movement of a body without the generation of any friction brought about through the contacting of two surfaces. It is also possible to control the extent of such movement and to restrain or control thrust without surface-generated friction. The support system of this invention may be employed under conditions of zero *g*, in vacuums, or in normal atmospheres and gravitational force conditions. Since no lubricants are used, no difficulties of lubricant loss through vaporization or of lubricant solidification at low temperatures are encountered. In fact, since the support system employs magnetic phenomena, it remains functional over a temperature range from absolute zero to near the Curie point of the magnetic materials used. Moreover, no heat is generated in maintaining the supporting forces, and no maintenance of the system is required.

It will thus be seen that the objects set forth above, among those made apparent from the preceding description, are efficiently attained; and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. A support system permitting movement of a body within predetermined limits and free from any friction generated through surface contact, comprising in combination (a) a movable member adapted to have said body mounted thereon and terminating at each end in a supported mass;

(b) a supporting mass associated with said supported mass, one of said associated masses being diamagnetic, the other being ferromagnetic of a size and configuration to generate a magnetic field having a field intensity decreasing sharply from its surface to the surface of its associated diamagnetic mass whereby said diamagnetic mass is maintained in spaced relationship to said ferromagnetic mass.

2. A support system in accordance with claim 1 wherein said supported mass is diamagnetic.

3. A support system in accordance with claim 1 wherein said supporting mass is of a cylindrical configuration and said supported mas is of a configuration adapted to rotate therein.

4. A support system in accordance with claim 3 wherein said supported mass is of a configuration adapted to rotate cumferentially alternating polarities.

5. A support system in accordance with claim 3 wherein said supporting mass is formed of magnets having polarities which alternate in the axial direction.

6. A support system in accordance with claim 1 further characterized by having means associated with said supporting mass adapted to control the axial thrust of said movable member.

7. A support system in accordance with claim 6 wherein said supported mass is diamagnetic and said supporting mass and said means adapted to control the axial thrust of said movable member are ferromagnetic.

8. A support system in accordance with claim 1 wherein said supporting mass provides at least one substantially flat surface and said supported mass is adapted for movement within a plane above said surface.

9. A support system in accordance with claim 1 wherein said supporting mass and said supported mass are contoured such as to permit a rocking motion of said movable member and said body mounted thereon.

10. A support system in accordance with claim 9 wherein said supporting mass and said supported mass are of hemispherical configurations.

11. A support system in accordance with claim 1 wherein said supported mass is spherical and said body is limited to rotational movement.

12. A support system in accordance with claim 1 wherein said supported mass is in the form of an annular ring and is affixed to said movable member through strut members.

13. A support system in accordance with claim 12 wherein said annular ring is diamagnetic and said supporting mass comprises a magnet having an annular pole with an inclined face and a central pole, said poles defining said magnetic field to maintain said diamagnetic ring in spaced relationship therewith.

References Cited

UNITED STATES PATENTS

| | | | |
|---|---|---|---|
| 3,124,962 | 3/1964 | Hirtreiter | 308—10 |
| 3,216,349 | 11/1965 | Kraft | 308—10 |
| 3,221,389 | 12/1965 | Cowell | 308—10 |
| 3,221,563 | 12/1965 | Wing | 308—10 |
| 3,243,238 | 3/1966 | Lyman | 308—10 |

MILTON O. HIRSHFIELD, Primary Examiner

R. SKUDY, Assistant Examiner